United States Patent [19]
Albrecht et al.

[11] 3,882,113
[45] May 6, 1975

[54] FLUORANTHENE DERIVATIVES

[75] Inventors: William L. Albrecht, Cincinnati, Ohio; Robert W. Fleming, Ann Arbor, Mich.

[73] Assignee: Richardson-Merrell Inc., Wilton, Conn.

[22] Filed: Dec. 21, 1972

[21] Appl. No.: 317,150

[52] U.S. Cl. 260/246 B; 260/293.62; 260/326.5 C; 260/326.85; 260/570.5 P; 260/570.8 R; 424/248; 424/267; 424/274; 424/330
[51] Int. Cl. .............................................. C07d 87/28
[58] Field of Search .... 260/246 B, 293.62, 570.8 R, 260/570.5 P, 326.85

[56] References Cited
UNITED STATES PATENTS
3,707,471  12/1972  Albrecht et al. ............... 260/246 B

*Primary Examiner*—Lorraine A. Weinberger
*Assistant Examiner*—Paul J. Killos
*Attorney, Agent, or Firm*—William J. Stein; Eugene O. Retter; George W. Rauchfuss, Jr.

[57] ABSTRACT

Novel 3,9-bis-basic alkanes of fluoranthene, their preparation and use for the prevention and inhibition of viral infections are disclosed.

6 Claims, No Drawings

FLUORANTHENE DERIVATIVES

FIELD OF THE INVENTION

The subject matter of the present invention relates to new organic chemical compounds, to methods of preparing such compounds, and to pharmaceutical compositions containing these compounds as the active ingredient. The compounds described herein are useful antiviral agents which inhibit or inactivate viruses by the treatment of the host with an effective amount of the active ingredient. Treated hosts include hosts which have been infected as well as noninfected hosts which are to be treated prophylactically.

BACKGROUND OF THE INVENTION

There is a growing suspicion that viruses may play a vital role in a broad range of diseases, some of which represent the most serious of man's ills. Many scientists suspect viruses to be linked with such diseases as arthritis, juvenile arthritis, diabetes, Hodgkin's disease, and various immunological diseases and degenerative diseases of the central nervous system as the causative agents.

At present, the control and treatment of virus infections is primarily achieved by means of immunization vaccines. For example, poliomyelitis, smallpox, measles and influenza are well recognized diseases in which viral vaccines have proved effective. In general, however, viral vaccines have had only a moderate success in animal prophylaxis. Each vaccine acts primarily against a specific virus and is not heterophilic in the protection it offers. Hence, vaccines are not a practical solution against the wide array of infectious viruses, even where limited, as for example, solely to respiratory viruses.

One approach to the control of virus-related diseases and, particularly to the spread of such virus diseases, has been to search for medicinal agents or chemotherapeutic agents capable of inhibiting the growth of viruses, thereby preventing the spread of disease as well as preventing further damage to cells and tissues of the animal host which have not as yet been infected. Heretofore, only a limited number of virus infections such as smallpox, Asian influenza, and herpes keratitis have been prevented by chemical antiviral agents. Sulfonamides and antibiotics which have revolutionized the treatment of bacterial infections have substantially no effect upon virus infections. Certan infections caused by very large viruses, such as lymphogranuloma venereum, psittacosis and trachoma have been successfully treated using antibiotics and sulfa drugs. However, the majority of infections have not been responsive to attack by chemotherapeutic agents. Thus, it can be seen that there is a need for new chemotherapeutic agents which are effective against a broad range of virus diseases, and which at the same time, are non-toxic to the host.

As a result of a long series of investigations, applicants have discovered a novel class of 3,9-bis-basic alkane derivatives of fluoranthene which are particularly useful as antiviral agents. These compounds are effective against a wide spectrum of virus infections and are useful in treating such infections both prophylactically and therapeutically.

Copending application, Ser. No. 32,348, filed Apr. 27, 1970, now abandoned, published as Belgium Pat. No. 766,284, represents the closest art known to applicants and discloses certain compounds useful as starting materials for the compounds of the present invention. To applicants' knowledge, the compounds described and claimed herein are novel compounds which have not been previously reported nor described in the literature. The instant compounds possess a wide spectrum of antiviral activity in varying degrees which could not have been predicted from a knowledge of the present state of the art.

SUMMARY OF THE INVENTION

This invention relates to new derivatives of fluoranthene, to their preparation and to their use as pharmaceutical agents. More particularly, the compounds of the present invention are 3,9-bis-basic alkanes of fluoranthene which are useful as antiviral agents. Still more particularly, the compounds of the present invention may be represented by the following general formula:

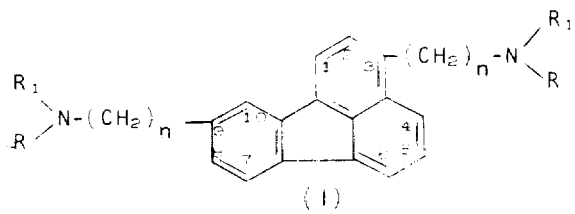

(I)

wherein $n$ is an integer of from 2 to 6; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the vinyl unsaturation is in a position other than in the 1-position of the alkenyl group, and when R and $R_1$ are taken together with the nitrogen atom to which they are attached represent the pyrrolidinyl, morpholino, piperidino or 4-lower alkyl piperidino radical, said 4-lower alkyl piperidino radical having from 1 to 4 carbon atoms; and their pharmaceutically acceptable acid addition salts.

The 3,9-bis-basic alkanes of fluoranthene can be prepared by the reduction of the corresponding 3,9-bis-basic fluoranthene ketones by means of hydrazine in the presence of a strong base as illustrated by the following general reaction scheme:

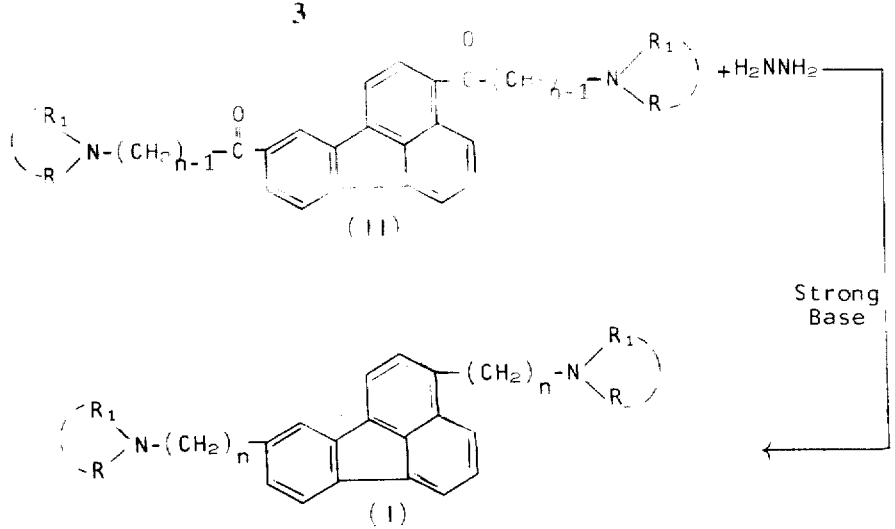

In the above reaction, the symbols, $n$, R and $R_1$ have the values previously assigned.

To achieve an antiviral effect the compounds of this invention are preferably administered to a host using a variety of compositions. Such compositions may be administered either prior to infection, as with a prophylactic use or treatment, or they may be therapeutically administered subsequent to infection, as with a curative use of treatment. Additionally, the compounds of this invention can be applied externally or topically directly to the virus infection, or they may be administered internally or systemically irrespective of whether the treatment is prophylactic or curative in nature. In either event, replication of the virus is inhibited or prevented with the concomitant result that the various disease symptoms characteristic of the pathogenic virus infection are no longer present.

DETAILED DESCRIPTION OF THE INVENTION

As can be seen from the above formula (I), the basic alkane groups,

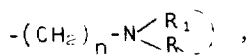

substituted on the fluoranthene ring consist of a basic amino function separated from the fluoranthene nucleus by an alkylene chain of prescribed length. It is further apparent that each of the basic alkane groups is located on one of the benzenoid positions of the fluoranthene ring.

The alkylene chain which separates the amino function from the fluoranthene ring consists of from 2 to 6 carbon atoms and represents either a straight or a branched alkylene chain. Additionally, each of the alkylene groups may be the same or different; preferably, however, both groups are the same. Illustrative of the various alkylene groups are: ethylene, 1,3-propylene, 1,4-butylene, 1,5-pentylene, 1,6-hexylene, 2-methyl-1,4-butylene and 3-methyl-1,5-pentylene.

The basic amino function can be a primary, secondary or a tertiary amino group. Preferably, each of the amino groups as represented by the symbols

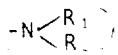

is a tertiary amino group. The symbols R and $R_1$ represent either hydrogen or a lower alkyl group. The term lower alkyl as used with regard to the amino groups relates to groups having from 1 to 6 carbon atoms. Illustrative of such groups can be mentioned straight or branched chain alkyl radicals such as: methyl, ethyl, 3-propyl, isopropyl, n-butyl, sec-butyl, isoamyl, n-pentyl and n-hexyl. When R and $R_1$ each represent lower alkyl, a preferred subgenus is formed.

Each R and $R_1$ of the basic amino function also represents a cycloalkyl group having from 3 to 6 carbon atoms. Such groups include the cyclopropyl, cyclobutyl, cyclopentyl and cyclohexyl radicals.

The symbols R and $R_1$ also represent an alkenyl group, having from 3 to 6 carbon atoms. In addition, the unsaturation present in this group must be in a position other than the 1-position inasmuch as any unsaturation at this point is readily hydrolyzable. Illustrative of such groups are the allyl, 3-butenyl and the 4-hexenyl radicals.

R and $R_1$ also represent various saturated, monocyclic, heterocyclic radicals when taken in conjunction with the amino nitrogen atom to which R and $R_1$ is attached. Typical of such heterocyclic groups are the pyrrolidinyl, morpholino, piperidino and 4-lower alkyl substituted piperidino radicals. Compounds containing such groups are readily prepared and typify saturated, monocyclic, heterocyclic radicals which are generally useful in lieu of the dilower alkyamino groups present in the compounds of this invention. When the piperidino radical is substituted in the 4-position, the substitution is that of a lower alkyl group having from 1 to 4 carbon atoms.

Illustrative of the base compounds of the present invention represented by general formula (I) are: 3,9-bis(3-dimethylaminopropyl)fluoranthene, 3,9-bis(4dimethylaminobutyl)fluoranthene, 3,9-bis(4-dibutylaminobutyl)fluoranthene, 3,9-bis(4-piperidinobutyl)fluoranthene, 3,9-bis[4-(4-methylpiperidino)butyl]fluoranthene, 3,9-bis(4-morpholinobutyl)fluoranthene, 3,9-bis(4-diallylaminobutyl) fluoranthene, 3,9-bis(5-diethylaminopentyl)fluoranthene, 3,9-bis[5-(N-cyclohexyl-N-methylamino)pentyl]fluoranthene, 3,9-bis[5-(4-propylpiperidino)pentyl]fluoranthene, 3,9-bis(5-diisopropylaminopentyl)fluoranthene, and 3,9-bis(5-diethylamino-3-methylpentyl)fluoranthene.

The expression "pharmaceutically acceptable acid addition salts" encompasses any non-toxic organic or inorganic acid addition salts of the base compounds represented by formula . Illustrative inorganic acids which form suitable salts include hydrochloric, hydrobromic, sulfuric and phosphoric acids and acid metal salts such as sodium monohydrogen orthophosphate and potassium hydrogen sulfate. Illustrative organic acids which form suitable salts include the mono, di and tricarboxylic acids, for example, acetic, fumaric, malic, tartaric, citric, ascorbic, maleic, hydroxymaleic, benzoic, hydroxybenzoic, phenylacetic, cinnamic, salicylic, 2-phenoxybenzoic and sulfonic acids such as methane sulfonic acid and 1-hydroxyethane sulfonic acid. Either the mono or di-acid salts can be formed, and such salts can exist in either a hydrated or a substantially anhydrous form.

The compounds of the present invention can be prepared by a reduction of the carbonyl oxygen atom of the corresponding 3,9-bis-basic fluoranthene ketones with hydrazine under modified Wolff-Kishner conditions. The 3,9-bis-basic fluoranthene ketones are, in turn, readily prepared via a Friedel-Crafts haloacylation of fluoranthene. The resulting 3,9-bis(ω-haloalkanoyl)fluoranthene derivatives can be aminated under a variety of conditions using either ammonia, a primary or a secondary amine. For example, the ω-haloalkanoyl derivative can be heated with a large excess of amine, the excess amine serving as the reaction medium and hydrohalide acceptor. Alternatively, the fluoranthene derivative may be heated with the amine in a suitable solvent such as toluene, dioxane or dimethylformamide to effect condensation. Specific illustrations for the preparation of 3,9-bis-basic fluoranthene ketones are more fully disclosed in copending application Ser. No. 32,348, filed Apr. 27, 1970, now abandoned, or its counterpart which has been issued as Belgium Pat. No. 766,284.

In general, the 3,9-bis-basic fluoranthene ketones are heated with hydrazine in the presence of a basic catalyst. The presence of water should be avoided in order to prevent azine formation via a condensation of the intermediate hydrazone which is formed with the carbonyl starting material. To achieve complete reduction, the reaction is conducted at elevated temperatures ranging from 140° to 180°C and for periods of time ranging from 12 to 48 hours. Conveniently, a high-boiling solvent such as a higher aliphatic alcohol or a polyglycol may be added, and the reaction mixture heated to its reflux temperature. In the practice of the present invention, applicants prefer to use diethylene glycol as the reaction solvent at its reflux temperature for a period of about 16 hours. Basic catalysts which may be employed include either sodium or potassium hydroxide. Additionally, sodium methoxide or ethoxide are useful catalysts which are equally operable in the preparation of the compounds of the present invention.

The compounds of the present invention are antiviral agents. Preferably they are administered to an animal host to prevent or inhibit viral infections. The term host refers to any viable biological material or intact animal including humans which is capable of inducing the formation of interferon and which serves as a support means for virus replication. The host can be of animal or mammalian origin. Illustratively such hosts include birds, mice, rats, guinea pigs, gerbils, ferrets, dogs, cats, cows, horses and humans. Other viable biological material such as used in the production of vaccines may also act as a host. Thus, tissue cultures prepared from organ tissues, such as mammalian kidney or lung tissue, as well as tissue cultures prepared from embryo tissue, such as obtained from amniotic cells or chick allantoic fluid, have been found to be useful hosts.

The treatment of virus infections for purposes of the present invention encompasses both the prevention and the inhibition of characteristic disease symptoms in a mammalian host susceptible to invasion by a pathogenic virus. Illustrative of mammalian virus infections which can be prevented or inhibited by the administration of the compounds of the present invention are infections caused by picornaviruses, such as encephalomyocarditis virus, myxoviruses, such as influenza $A_2$ (Jap/305) virus; arboviruses, such as Semliki forest virus; the herpes group of viruses, including herpes simplex; and the poxviruses, as for example vaccinia 1HD. Thus, for example, the compounds of the present invention when administered orally or subcutaneously to mice in varying doses either shortly prior or subsequent to a fatal inoculation of a neurotropic virus such as encephalomyocarditis virus, having a $LD_{50}$ anywhere from 5 to 50, delay or prevent completely the onset of death. Salts of these compounds are generally administered in compositions containing a 0.15 % aqueous hydroxyethylcellulose vehicle, whereas the free base compounds are generally administered in compositions containing a 10% aqueous surfactant vehicle in order to help solubilize the compound. In general, ten mice are used for each treated group with an additional 20 mice serving as a control group. At the time of administration the test virus is titrated in order to determine the potency or $LD_{50}$ for the particular virus pool used as a challenge. The control animals are given a placebo containing the identical volume of vehicle without, of course, the active ingredient. Because of the lethal nature of the test system employed, the antiviral nature of the test compound is dramatically illustrated by a side by side comparison of the survival time of treated animals with the untreated control group of animals.

Respiratory viruses, such as influenza $A_2$ (Jap/305) virus, which are also lethal to the test animals employed, are administered via intranasal instillation. Animals infected in this manner have the active ingredients administered in the same manner as the test virus, and again a side by side comparison is made of the survivors of the animals treated with the untreated control animals.

Inexplicably, a mouse fatally infected with encephalomyocarditis or influenza virus occasionally survives without further treatment. This may be the result of a prior, interferon-induced infection in the mouse, or perhaps due to some genetic factor or other natural defense mechanism not presently understood. For this reason the control group selected is of sufficient size so as to statistically reduce the influence of such a chance survivor upon the test results to a negligible amount.

The vaccinia test virus is typical of the dermatotrophic type viruses which respond to treatment with compositions containing the compounds of the instant invention. The vaccinia virus generally produces a non-fatal infection in mice, producing characteristic tail lesions when the virus is subcutaneously administered to the tail of the mouse. The instant compounds are administered either orally or subcutaneously either prior to or subsequent to the vaccinia infection. Tail lesions are subjectively scored on the eighth day following infection against untreated animals which serve as a control group. The compounds of the present invention have been found to be effective in varying degrees against one or all of these test virus systems.

The mode of activity of the active ingredients of the present invention is not rigorously defined. Inter alia, the compounds of the present invention may induce the formation of interferon in a viable host. Interferon is a biological substance of unknown chemical structure, presumably proteinaceous in nature, which is produced by host cells in response to a viral infection. The interferon so produced acts to induce a virus inhibiting substance, which inhibits in some yet unknown manner the intracellular replication of the virus without appearing to have any inactivation effect per se upon the virus itself. A few of the viruses susceptible to interferon replication inhibition are described in Horsfall and Tamm, "Viral and Rickettsial Infections of Man," 4th Edition (1965), J. B. Lippincott Company, pp. 328-9.

As previously indicated, the compounds of the present invention may by prophylactically administered in order to prevent the spread of contagious viral diseases or they may be therapeutically administered to a host already infected intended for their curative effect. When administered prophylactically, it is preferred that the administration be made within 0 to 96 hours prior to the infection of the host animal with a pathogenic virus. When the compounds of the present invention are administered for their curative effect, it is preferred that they are administered within about 1 or 2 days following infection of the host in order to obtain the maximum therapeutic effect.

The dosage to be administered will be dependent upon such parameters as the particular virus for which either treatment or prophylaxis is desired, the species of animal involved, its age, health, weight, the extent of infection, concurrent treatment, if any, frequency of treatment and the nature of the effect desired. A daily dose of the active ingredients will generally range from about 0.1 mg to about 500 mg per kg of body weight. Illustratively, dosage levels of the administered active ingredients for intravenous treatment range from about 0.1 mg to about 10 mg per kg of body weight; intraperitoneal administration ranges from about 0.1 mg to about 50 mg per kg of body weight; subcutaneous administration ranges from about 0.1 mg to about 250 mg per kg of body weight; oral administration may be from about 0.1 mg to about 500 mg per kg of body weight, intranasal instillation ranges from about 0.1 mg to about 10 mg per kg of body weight; and for aerosol inhalation therapy, the range is generally from about 0.1 mg to about 10 mg per kg of body weight.

The novel compounds described herein can also be administered in various different dosage unit forms, e.g., oral compositions such as tablets, capsules, dragees, lozenges, elixirs, emulsions, clear liquid solutions and suspensions; parenteral compositions such as intramuscular, intravenous or intradermal preparations; and topical compositions, such as lotions, creams or ointments. The amount of active ingredient contained in each dosage unit form will, of course, vary widely according to the particular dosage unit employed, the animal host being treated, and the nature of the treatment, i.e., whether prophylactic or therapeutic in nature. Thus, a particular dosage unit may contain from about 2.0 mg to over 3.0 g of active ingredient in addition to the pharmaceutical excipients contained therein.

The novel compounds described herein can be employed in conjunction or admixture with additional organic or inorganic pharmaceutical excipients. Suitable solid excipients include gelatin, lactose, starches, magnesium stearate and petrolatum. Suitable liquid excipients include water and alcohols such as ethanol, benzyl alcohol and the polyethylene alcohols either with or without the addition of a surfactant. In general, the preferred liquid excipients particularly for injectable preparations, include water, saline solution, dextrose and glycol solutions such as an aqueous propylene glycol or an aqueous solution of polyethylene glycol. Liquid preparations to be used as sterile injectable solutions will ordinarily contain from about 0.5 to about 25% by weight, and preferably from about 1 to about 10% by weight, of the active ingredient in solution. In certain topical and parenteral preparations, various oils are utilized as carriers or excipients. Illustrative of such oils are mineral oils, glyceride oils such as lard oil, cod liver oil, peanut oil, sesame oil, corn oil and soybean oil.

A preferred method of administration for the compounds of the present invention is orally either in a solid dose form such as a tablet or capsule, or in a liquid dose form such as an elixir, suspension, emulsion or syrup. Ordinarily the active ingredient comprises from about 0.5 to about 10% by weight in an oral liquid composition. In such compositions, the pharmaceutical carrier is generally aqueous in nature, as for example, aromatic water, a sugar-based syrup or a pharmaceutical mucilage. For insoluble compounds suspending agents may be added as well as agents to control viscosity, as for example, magnesium aluminum silicate or carboxymethylcellulose. Buffers, preservatives, emulsifying agents and other excipients can also be added.

For parenteral administration such as intramuscular, intravenous or subcutaneous administration, the proportion of active ingredient ranges from about 0.05 to about 20% by weight, and preferably from about 0.1 to about 10% by weight of the liquid composition. In order to minimize or eliminate irritation at the site of the injection, such compositions may contain a non-ionic surfactant having a hydrophile-lipophile balance (HLB) of from about 12 to about 17. The quantity of surfactant in such formulations ranges from about 5 to about 15% by weight. The surfactant can be a single component having the aboveidentified HLB, or a mixture of two or more components having the desired HLB. Illustrative of surfactants useful in parenteral formulations are the class of polyoxyethylene sorbitan fatty acid esters as, for example, sorbitan monooleate and the high molecular weight adducts of ethylene oxide with a hydrophobic base, formed by the condensation of propylene oxide with propylene glycol. The concentration of active ingredient contained in these various parenteral dosage unit forms varies over a broad range and comprises anywhere from about 0.05 to about 20% by weight of the total formulation, the remaining component or components comprising excipients previously mentioned.

The active ingredients of the present invention can also be admixed directly with animal feeds or incorporated into the drinking water of animals. For most purposes, an amount of active ingredient is used which provides from about 0.0001 to about 0.1% and preferably, from about 0.001 to about 0.02% by weight of the active ingredient based upon the total weight of feed intake. The active ingredients can be admixed in animal feed concentrates, suitable for use by farmers or livestock growers for incorporation in appropriate amounts with the final animal feeds. These concentrates ordinarily comprise from about 0.5 to about 95% by weight of the active ingredient compounded with a finely divided solid carrier or flour, such as wheat, corn, soybean or cottonseed flour. Depending upon the particular animal to be fed, nutrients and fillers may also be added such as ground cereal, charcoal, fuller's earth, oyster shells and finely divided attapulgite or bentonite.

The active ingredients of the present invention can be packaged in a suitable pressurized container together with an aqueous or volatile propellant for use as an aerosol. A suitable discharge valve is fitted to an opening in the container from which the active ingredients may be conveniently dispensed in the form of a spray, liquid, ointment or foam. Additional adjuvants such as co-solvents, wetting agents and bactericides may be employed as necessary. Normally, the propellant used is a liquified gaseous compound, preferably a mixture of low molecular weight fluorinated hydrocarbons. These haloalkanes are preferred because of their compatibility with the active ingredients of the present invention, and because they are non-irritating when applied to skin surfaces. Other useful propellants include ethylene oxide, carbon dioxide, propane and nitrogen gas.

The invention described herein is more particularly illustrated by means of the following specific examples:

EXAMPLE I 3,9-Bis(4-piperidinobutyryl)fluoranthene

A solution of 11.3 g (0.03 mole) of 3,9-bis(4-chlorobutyryl)fluoranthene, 20.4 g (0.24 mole) of piperidine, 10.0 g (0.06 mole) potassium iodide and 200 ml of butanone is stirred and heated at the reflux temperature for 3 days and poured into 1000 ml of water. The precipitate which forms is filtered and recrystallized three times from a chloroform-acetone solution to yield the desired product m.p. 126°–8.5°C; $\lambda_{max}^{CHCl_3}$ 306; and $E_{1cm}^{1\%}$ 797.

Following the above procedure but substituting 13.2 g (0.03 mole) of 3,9-bis(5-chlorovaleryl)fluoranthene and 30.5 g (0.24 mole) of 4-propylpiperidine results in the formation of 3,9-bis[5-(4-propylpiperidino)-valeryl]fluoranthene. Recrystallization of the solid obtained from a chloroform-acetone solution yields a product having a m.p. 146°–8°C; $\lambda_{max}^{EtOH}$ 303; and $E_{1cm}^{1\%}$ 650.

EXAMPLE II 3,9-Bis(4-morpholinobutyryl) fluoranthene dihydrochloride

A solution of 20.6 g (0.05 mole) of 3,9-bis(4-chlorobutyryl)fluoranthene, 34.9 g (0.4 mole) of morpholine, 16.6 g of potassium iodide and 200 ml of butanone is refluxed with stirring for 24 hours and poured into water. The organic layer which separates is washed with a saturated aqueous sodium chloride solution, dried over magnesium sulfate, filtered and the filtrate acidified with ethereal HCl. The 3,9-bis(4-morpholinobutyryl)fluoranthene dihydrochloride salt is recrystallized twice from methanol-butanone to yield a product having a m.p. 188°–91°C; $\lambda_{max}^{H_2O}$ 302; and $E_{1cm}^{1\%}$ 584.

EXAMPLE III 3,9-Bis(4-piperidinobutyl) fluoranthene dihydrochloride

A solution of 16.8 g (0.03 mole) of 3,9-bis(4-piperidinobutyryl)fluoranthene, 25.4 ml (0.33 mole) of 85% hydrazine hydrate solution and 200 ml of diethylene glycol is stirred and slowly heated to a temperature of approximately 100°C, during which the reaction mixture changes from a yellow to an orange-red color as a result of the hydrazone intermediate which is formed. Any water vapor present is permitted to escape after which 18.5 g (0.33 mole) of potassium hydroxide is added. The reaction mixture is refluxed for 16 hours and poured onto 1 liter of cracked ice. The reaction mixture is extracted with chloroform and the combined extracts washed with water, followed by a wash with a saturated solution of sodium chloride. The organic layer is dried over magnesium sulfate, filtered and the solvent removed in vacuo. The residue is dissolved in butanone and acidified to Congo Red indicator using ethereal hydrochloric acid. The 3,9-bis(4-piperidinobutyl)fluoranthene dihydrochloride so prepared is filtered, washed with acetone and recrystallized twice from a methanol-butanone solution m.p. 283°–6°C (dec.)
$\lambda_{max}^{H_2O}$ 291; and $E_{1cm}^{1\%}$ 823.

Following essentially the same procedure but substituting 3,9-bis(4-morpholinobutyryl)fluoranthene dihydrochloride monohydrate for the 3,9-bis(4-piperidinobutyryl)fluoranthene above, results in the preparation of 3,9-bis(4-morpholinobutyl)fluoranthene dihydrochloride having a m.p. 280°–2°C; $\lambda_{max}^{H_2O}$ 291; and $E_{1cm}^{1\%}$ 843.

EXAMPLE IV

Using the procedure of Example III, but substituting for the 3,9-bis(4-piperidinobutyryl)fluoranthene, the appropriate molar equivalent amounts of 3,9-bis(4-dimethylaminobutyryl)fluoranthene, 3,9-bis(4-dibutylaminobutyryl)fluoranthene or 3,9-bis[4-(4-methylpiperidino)butyryl]fluoranthene results in the preparation of 3,9-bis(4-dimethylaminobutyl)fluoranthene dihydrochloride, 3,9-bis(4-dibutylaminobutyl)fluoranthene dihydrochloride, and 3,9-bis[4-(4-methylpiperidino)butyl]fluoranthene dihydrochloride, respectively.

EXAMPLE V 3,9-Bis[5-(4-propylpiperidino)pentyl]fluoranthene dihydrochloride

A solution of 5.0 g (0.08 mole) of 3,9-bis[5-(4-propylpiperidino)valeryl]fluoranthene, 6.2 ml (0.08 mole) of an 85% hydrazine hydrate solution, 100 ml of xylene and 100 ml of diethylene glycol is heated at its reflux temperature for approximately 16 hours. A Dean Stark trap is used to remove water. The reaction mixture is poured onto 1 liter of cracked ice and extracted with chloroform. The combined chloroform extracts are washed with water, followed by a wash with a saturated aqueous solution of sodium chloride, dried over magnesium sulfate, filtered and the solvent removed in vacuo. The residue is dissolved in butanone and acidified with ethereal hydrochloric acid. The solid which forms is recrystallized once from a methanol-butanone solution resulting in the formation of 3,9-bis[5-(4- propylpiperidino)penytyl]fluoranthene dihydrochloride having a m.p. 211°–3°C;
$\lambda_{max}^{H_2O}$ 293; and $E_{1cm}^{1\%}$ 618.

Following essentially the same procedure but substituting for the 3,9-bis[5-(4-propylpiperidino)valeryl]fluoranthene above an appropriate molar equivalent amount of 3,9-bis(5-diethylaminovaleryl)fluoranthene, 3,9-bis[5-(N-cyclohexyl-N-methylamino)valeryl]fluoranthene or 3,9-bis(5-diisopropylaminovaleryl)fluoranthene, results in the formation of 3,9-bis(5-diethylaminopentyl)fluoranthene dihydrochloride, 3,9-bis[5-(N-cyclohexyl-N-methylamino)pentyl]fluoranthene dihydrochloride or 3,9-bis(5-diisopropylaminopentyl)fluoranthene dihydrochloride, respectively.

EXAMPLE VI

The following Example is illustrative of the antiviral activity for the compounds of the present invention.

Twenty-nine mice weighing approximately 12 to 15 gms each are divided into two groups, a control group of 19 animals and a test group of 10 animals. All of the animals are challenged with a fatal dose ($37LD_{50}$) of encephalomyocarditis virus. The test group of animals are tested both prophylactically and therapeutically using a parenteral composition containing 3,9-bis(4-piperidinobutyl)fluoranthene dihydrochloride as the active ingredient dissolved in a solution of 0.15% aqueous hydroxyethylcellulose solution as the vehicle. The composition contains the active ingredient in an amount such that each dosage contains 0.25 ml which is equivalent to a dose level of 50 mg per kg. The control group receives a subcutaneous placebo containing the same volume of vehicle without the active ingredient. Observations over a 10 day period show the termination of all of the control animals within a period of from 4 to 5 days, with the treated group surviving for a substantially longer period of time.

EXAMPLE VII

Preparation of a tablet formulation

An illustrative preparation of 10,000 tablets, each containing 100 mg of 3,9-bis(5-diethylaminopentyl)fluoranthene dihydrochloride is prepared as follows:

|     |                                                              | Gm.   |
| --- | ------------------------------------------------------------ | ----- |
| (a) | 3,9-bis(5-diethylaminopentyl)fluoranthene dihydrochloride    | 1000  |
| (b) | Lactose                                                      | 1000  |
| (c) | Starch paste (10% w/v starch in water)                       | 100   |
| (d) | Starch                                                       | 32.5  |
| (e) | Calcium stearate                                             | 6.5   |

The active ingredient is uniformly mixed with the lactose and granulated by the addition of the starch paste. The granules which form are dried at 120°F for 20 hours and forced through a No. 16 screen. The granules are lubricated by the addition of the starch and calcium stearate and compressed into tablets. Each tablet so prepared contains 100 mg of the active ingredient.

EXAMPLE VIII

Preparation of a capsule formulation

An illustrative composition for the preparation of 1000 two-piece hard gelatin capsules, each containing 100 mg of 3,9-bis[5-(4-propylpiperidino)pentyl]fluoranthene is prepared as follows:

|     |                                              | Gm. |
| --- | -------------------------------------------- | --- |
| (a) | 3,9-bis[5-(4-propylpiperidino)pentyl]fluoranthene | 100 |
| (b) | Corn starch                                  | 150 |
| (c) | Magnesium stearate                           | 25  |
| (d) | 1000 Hard gelatin capsules                   |     |

The finely powdered ingredients are mixed until uniformly dispersed and then filled into hard shelled gelatin capsules of the appropriate size.

In a similar fashion, soft gelatin capsules may be prepared in which the above composition can be granulated, slugged or directly compressed in a rotary die or plate mold in which the soft gelatin capsule is formed. Alternatively, the above excipients may be omitted and the active ingredient dispensed as a powder directly into the soft gelatin capsule.

EXAMPLE IX

Preparation of an oral syrup formulation

A 2% weight per volume syrup of 3,9-bis(5-diethylaminopentyl)fluoranthene dihydrochloride is prepared in accordance with the usual pharmaceutical techniques which has the following formula:

|     |                                                          | Gm.   |
| --- | -------------------------------------------------------- | ----- |
| (a) | Finely divided 3,9-bis(5-diethylaminopentyl)fluoranthene dihydrochloride | 2.0   |
| (b) | Sucrose                                                  | 33.3  |
| (c) | Chloroform                                               | 0.25  |
| (d) | Sodium Benzoate                                          | 0.4   |
| (e) | Methyl p-hydroxybenzoate                                 | 0.02  |
| (f) | Vanillin                                                 | 0.04  |
| (g) | Glycerol                                                 | 1.5   |
| (h) | Purified water to 100.0 ml                               |       |

EXAMPLE X

Preparation of an ointment formulation

One thousand grams of an ointment for topical application containing 1.0% of 3,9-bis(4-morpholinobutyl)fluoranthene dihydrochloride is prepared from the following ingredients:

|     |                                                | Gm.  |
| --- | ---------------------------------------------- | ---- |
| (a) | 3,9-bis(4-morpholinobutyl)fluoranthene dihydrochloride | 10   |
| (b) | Light liquid petrolatum                        | 250  |
| (c) | Wool fat                                       | 200  |
| (d) | White petrolatum q.s. ad                       | 1000 |

The wool fat, white petrolatum and 200 gms of the light liquid petrolatum are liquified and held at 110°F. The active ingredient is mixed with the remaining liquid petrolatum and passed through a colloid mill. After passing thorugh the mill, the mixture is stirred into the melt, and the melt is permitted to cool with continued stirring until congealed.

EXAMPLE X

Preparation of a parenteral formulation

An illustrative composition for an emulsion which is parenterally injectable is as follows:

| Each ml Contains | Ingredients                        | Amount     |
| ---------------- | ---------------------------------- | ---------- |
| 50 mg            | 3,9-bis(4-piperidinobutyl)fluoranthene | 1.000 g    |
| 100 mg           | Polyoxyethylene sorbitan monooleate | 2.000 g    |
| 0.0064           | Sodium chloride                    | 0.128 g    |
|                  | Water for injection, q.s.          | 20.000 ml  |

The parenteral composition is prepared by dissolving 0.64 g of sodium chloride in 100 ml of water suitable for injection. The polyoxyethylene sorbitan monooleate is mixed with the active ingredient, and an amount of the previously prepared aqueous sodium chloride solution added which is sufficient to bring the total volume to 20 ml. The resulting solution is shaken and autoclaved for 20 minutes at 110°C at 15 p.s.i.p. steam pressure. The composition can be dispensed in single ampule for use in multiple dosages or it can be dispensed as 10 or 20 individual ampules for use as a single dosage unit.

We claim:

1. A 3,9-bis-basic alkane of fluoranthene having the general formula:

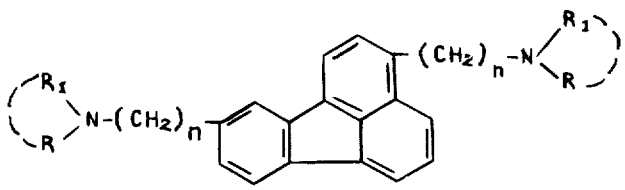

wherein $n$ is an integer of from 2 to 6; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the vinyl unsaturation is in a position other than in the 1-position of the alkenyl group, and when R and $R_1$ are taken together with the nitrogen atom to which they are attached represent the pyrrolidinyl, morpholino, piperidino or 4-lower alkyl piperidino radical, said 4-lower alkyl piperidino radical having from 1 to 4 carbon atoms; and their pharmaceutically acceptable acid addition salts.

2. A compound of claim 1 wherein each R and $R_1$ is lower alkyl.

3. A compound of claim 1 wherein R and $R_1$ when taken together with the nitrogen to which they are attached are 4-lower alkyl piperidino.

4. The compound, 3,9-bis(4-piperidinobutyl)fluoranthene and its pharmaceutically acceptable acid addition salts.

5. The compound, 3,9-bis[5-(4-propylpiperidino)-pentyl]fluoroanthene and its pharmaceutically acceptable acid addition salts.

6. The compound, 3,9-bis(4-morpholinobutyl)fluoranthene and its pharmaceutically acceptable acid addition salts.

* * * * *